US011149558B2

(12) United States Patent
Jain et al.

(10) Patent No.: US 11,149,558 B2
(45) Date of Patent: Oct. 19, 2021

(54) FRANGIBLE GAS TURBINE ENGINE AIRFOIL WITH LAYUP CHANGE

(71) Applicant: General Electric Company, Schenectady, NY (US)

(72) Inventors: Nitesh Jain, Bangalore (IN); Nicholas Joseph Kray, Mason, OH (US); Kishore Budumuru, Bangalore (IN)

(73) Assignee: General Electric Company, Schenectady, NY (US)

(*) Notice: Subject to any disclaimer, the term of this patent is extended or adjusted under 35 U.S.C. 154(b) by 351 days.

(21) Appl. No.: 16/161,200

(22) Filed: Oct. 16, 2018

(65) Prior Publication Data

US 2020/0116043 A1 Apr. 16, 2020

(51) Int. Cl.
*F01D 5/28* (2006.01)
*F01D 21/04* (2006.01)
*F02K 3/06* (2006.01)

(52) U.S. Cl.
CPC .......... *F01D 5/282* (2013.01); *F01D 21/045* (2013.01); *F02K 3/06* (2013.01); *F05D 2220/36* (2013.01); *F05D 2230/31* (2013.01); *F05D 2240/30* (2013.01); *F05D 2300/6034* (2013.01)

(58) Field of Classification Search
CPC .... F01D 5/282; F01D 21/045; F05D 2240/30; F05D 2300/6034; F05D 2220/36; F05D 2240/307; F05D 2300/6033; F04D 29/388
See application file for complete search history.

(56) References Cited

U.S. PATENT DOCUMENTS

| 3,096,930 | A | | 7/1963 | Meyerhoff |
| 3,156,808 | A | | 11/1964 | Davies et al. |
| 3,175,804 | A | | 3/1965 | Bunger |
| 3,368,795 | A | * | 2/1968 | Bolin ............... F01D 5/282 |
| | | | | 416/229 R |
| 3,394,918 | A | | 7/1968 | Wiseman |
| 3,626,568 | A | | 12/1971 | Silverstein et al. |
| 3,761,201 | A | | 9/1973 | Silverstein et al. |

(Continued)

FOREIGN PATENT DOCUMENTS

| CN | 103628923 B | 3/2016 |
| EP | 0526057 A1 | 2/1993 |

(Continued)

*Primary Examiner* — J. Todd Newton
*Assistant Examiner* — Christopher R Legendre
(74) *Attorney, Agent, or Firm* — Dority & Manning, P.A.

(57) ABSTRACT

An airfoil including a plurality of composite plies extending from a leading edge to a trailing edge and between a tip and a root. The airfoil further includes a frangible airfoil portion at the tip extending between the leading edge and the trailing edge and extending between the tip and a frangible line along a span including a first plurality of composite plies. Each of the first plurality of composite plies includes fibers oriented at least partially along a chordwise direction, a thickness direction, or both. The airfoil further includes a residual airfoil portion extending from the frangible line to the root along the span including a second plurality of composite plies. The second plurality of composite plies includes at least one composite ply with fibers oriented along the span. Further, the residual airfoil portion meets the frangible airfoil portion at the frangible line.

20 Claims, 6 Drawing Sheets

(56) References Cited

U.S. PATENT DOCUMENTS

| | | |
|---|---|---|
| 4,000,956 A | 1/1977 | Carlson et al. |
| 4,022,540 A | 5/1977 | Young |
| 4,022,547 A | 5/1977 | Stanley |
| 4,043,703 A | 8/1977 | Carlson |
| 4,071,184 A | 1/1978 | Carlson et al. |
| 4,111,600 A | 9/1978 | Rothman et al. |
| 4,426,193 A | 1/1984 | Carlson |
| D273,037 S | 3/1984 | Dodge |
| 4,627,791 A * | 12/1986 | Marshall ............... B64C 11/26 416/132 R |
| 4,971,641 A | 11/1990 | Nelson et al. |
| 5,112,194 A | 5/1992 | More |
| 5,123,813 A | 6/1992 | Przytulski et al. |
| 5,129,787 A | 7/1992 | Violette et al. |
| 5,141,400 A | 8/1992 | Murphy et al. |
| 5,222,297 A | 6/1993 | Graff et al. |
| 5,269,658 A | 12/1993 | Carlson et al. |
| 5,363,554 A | 11/1994 | Partridge et al. |
| 5,375,978 A | 12/1994 | Evans et al. |
| 5,392,514 A | 2/1995 | Cook et al. |
| 5,449,273 A | 9/1995 | Hertel et al. |
| 5,486,096 A | 1/1996 | Hertel et al. |
| 5,520,532 A | 5/1996 | Reinfelder et al. |
| 5,580,217 A | 12/1996 | Richards et al. |
| 5,738,491 A | 4/1998 | Lee et al. |
| 5,836,744 A | 11/1998 | Zipps et al. |
| 5,843,354 A | 12/1998 | Evans et al. |
| 5,844,669 A | 12/1998 | Wang et al. |
| 5,908,285 A | 6/1999 | Graff |
| 5,935,360 A | 8/1999 | Griggs |
| 5,939,006 A | 8/1999 | Wang et al. |
| 6,146,099 A | 11/2000 | Zipps et al. |
| 6,241,469 B1 | 6/2001 | Beeck et al. |
| 6,290,895 B1 | 9/2001 | Wang et al. |
| 6,294,113 B1 | 9/2001 | Woodmansee et al. |
| 6,402,469 B1 | 6/2002 | Kastl et al. |
| 6,413,051 B1 | 7/2002 | Chou et al. |
| 6,516,865 B1 | 2/2003 | Beeck et al. |
| 6,709,230 B2 | 3/2004 | Morrison et al. |
| 6,843,565 B2 | 1/2005 | Evans et al. |
| 7,114,912 B2 | 10/2006 | Gerez et al. |
| 7,384,240 B2 * | 6/2008 | McMillan ............... F01D 5/147 416/131 |
| 7,736,130 B2 | 6/2010 | Schilling et al. |
| 7,780,410 B2 | 8/2010 | Kray et al. |
| 7,794,197 B2 | 9/2010 | Thompson et al. |
| 7,837,446 B2 | 11/2010 | McMillan |
| 7,972,109 B2 | 7/2011 | Crall et al. |
| 8,038,408 B2 | 10/2011 | McMillan |
| 8,083,487 B2 | 12/2011 | Wood et al. |
| 8,100,662 B2 | 1/2012 | Schreiber |
| 8,109,734 B2 | 2/2012 | Backhouse |
| 8,146,250 B2 | 4/2012 | Moroso |
| 8,234,990 B2 | 8/2012 | Xie et al. |
| 8,251,640 B2 | 8/2012 | Beckford et al. |
| 8,366,378 B2 | 2/2013 | Beckford et al. |
| 8,459,955 B2 | 6/2013 | McMillan et al. |
| 8,573,936 B2 | 11/2013 | Lafont |
| 8,647,072 B2 | 2/2014 | McMillan |
| 8,685,297 B2 | 4/2014 | Schreiber |
| 9,085,989 B2 | 7/2015 | Shah et al. |
| 9,157,139 B2 | 10/2015 | Rajagopalan |
| 9,321,100 B2 | 4/2016 | Dambrine et al. |
| 9,410,437 B2 | 8/2016 | Paige et al. |
| 9,475,119 B2 | 10/2016 | Cui et al. |
| 9,556,742 B2 | 1/2017 | Parkin et al. |
| 9,689,269 B2 | 6/2017 | Bottome |
| 9,878,501 B2 | 1/2018 | Zatorski et al. |
| 9,914,282 B2 * | 3/2018 | Roach .................... B32B 5/145 |
| 9,945,234 B2 | 4/2018 | Jevons et al. |
| 9,995,164 B2 | 6/2018 | Nishijima et al. |
| 2006/0188736 A1 | 8/2006 | Luthra et al. |
| 2007/0036658 A1 | 2/2007 | Morris |
| 2007/0202296 A1 | 8/2007 | Chandrasekaran et al. |
| 2008/0273983 A1 | 11/2008 | Clark et al. |
| 2009/0035131 A1 | 2/2009 | McMillan |
| 2009/0269203 A1 | 10/2009 | Care et al. |
| 2010/0054937 A1 | 3/2010 | Beckford et al. |
| 2010/0150707 A1 | 6/2010 | Jevons |
| 2010/0242843 A1 | 9/2010 | Peretti et al. |
| 2010/0296942 A1 | 11/2010 | Jevons |
| 2011/0023301 A1 | 2/2011 | Jones |
| 2011/0027096 A1 | 2/2011 | Northfield |
| 2011/0049297 A1 | 3/2011 | Jevons et al. |
| 2011/0052405 A1 | 3/2011 | Parkin |
| 2011/0129351 A1 | 6/2011 | Das et al. |
| 2011/0182743 A1 | 7/2011 | Naik |
| 2011/0194941 A1 | 8/2011 | Parkin et al. |
| 2011/0217160 A1 | 9/2011 | McMillan |
| 2011/0223027 A1 | 9/2011 | Klinetob et al. |
| 2011/0299990 A1 | 12/2011 | Marra et al. |
| 2012/0003100 A1 | 1/2012 | James et al. |
| 2012/0021243 A1 | 1/2012 | Kray et al. |
| 2012/0028055 A1 | 2/2012 | Schmidt |
| 2012/0034089 A1 | 2/2012 | Wadewitz et al. |
| 2012/0051935 A1 | 3/2012 | Naik et al. |
| 2012/0082556 A1 | 4/2012 | Macchia et al. |
| 2012/0100006 A1 | 4/2012 | Merriman et al. |
| 2015/0218953 A1 | 8/2015 | Bottome |
| 2016/0123159 A1 | 5/2016 | Thompson |
| 2016/0167269 A1 | 6/2016 | Pautard |
| 2017/0226867 A1 | 8/2017 | Nandula et al. |
| 2017/0254207 A1 | 9/2017 | Schetzel et al. |
| 2017/0321714 A1 | 11/2017 | Jain et al. |
| 2017/0335856 A1 | 11/2017 | Lander et al. |
| 2017/0363062 A1 | 12/2017 | Merzhaeuser et al. |
| 2017/0370376 A1 | 12/2017 | Kray et al. |
| 2018/0119551 A1 | 5/2018 | Romero et al. |
| 2018/0178489 A1 | 6/2018 | M'Membe et al. |
| 2020/0116043 A1 * | 4/2020 | Jain ...................... F01D 21/045 |

FOREIGN PATENT DOCUMENTS

| | | |
|---|---|---|
| FR | 2953225 A1 | 6/2011 |
| FR | 2994708 A1 | 2/2014 |
| GB | 2450139 A | 12/2008 |
| JP | 2001041002 A | 2/2001 |
| WO | WO2008122751 A2 | 10/2008 |

* cited by examiner

FRANGIBLE GAS TURBINE ENGINE AIRFOIL WITH LAYUP CHANGE

FIELD

The present subject matter relates generally to airfoils, and more particularly, to frangible airfoils for gas turbine engines including a change in a ply layup orientation.

BACKGROUND

Airfoils used in aircraft engines, such as fan blades of a gas turbine engine, can be susceptible to extreme loading events. For instance, a fan blade might strike a bird that is ingested into the engine, or a blade-out occurrence may arise wherein one of the fan blades is severed from a rotor disk. If the impact is large enough, a fan blade may break apart into one or more shards before traveling downstream through the engine.

Gas turbine engines, such as turbofans, generally include fan cases surrounding a fan assembly including the fan blades. The fan cases are generally configured to withstand an impact of the fan blades due to adverse engine conditions resulting in a failure mode, such as foreign object damage, hard rubs due to excessive or extreme unbalance or fan rotor oscillations, or fan blade liberation. However, such airfoil configurations generally increase the weight of the fan case, thereby increasing the weight of the engine and aircraft and reducing performance and efficiency.

Known fan cases generally include frangible structures, such as honeycombs or trench-filler material, configured to mitigate load transfer to and through the fan case. However, this approach is generally costly. Furthermore, this approach may result in larger, heavier, less efficient fan cases. Still further, this approach may not address issues relating to fan rotor unbalance following deformation or liberation of one or several airfoils such as fan blades.

As such, there is a need for an airfoil that enables a controlled and consistent failure mode of the airfoil that may enable reducing a cost, weight, and load transfer to a surrounding casing.

BRIEF DESCRIPTION

Aspects and advantages will be set forth in part in the following description, or may be obvious from the description, or may be learned through practice of the invention.

In one aspect, the present subject matter is directed to an airfoil defining a span extending in a spanwise direction between a root and a tip, a chordwise direction extending between a leading edge and a trailing edge, and a thickness direction extending between a pressure side and a suction side. The airfoil includes a frangible airfoil portion extending between the leading edge and the trailing edge and extending between the tip and a frangible line along the span. The frangible airfoil portion includes a first plurality of composite plies having fibers that are oriented at least partially along the chordwise direction, the thickness direction, or both. The airfoil further includes a residual airfoil portion extending from the frangible line to the root along the span. The residual airfoil portion includes a second plurality of composite plies. The second plurality of composite plies includes at least one composite ply with fibers oriented along the spanwise direction. Further, the residual airfoil portion meets the frangible airfoil portion at the frangible line.

In one embodiment, the frangible airfoil portion deforms or partially or fully detaches relative to the residual airfoil portion at the frangible line following an event creating imbalance. In another embodiment, one or more butt joints may join at least one composite ply of the first plurality of composite plies with at least one composite ply of the second plurality of composite plies. In one embodiment, the frangible airfoil portion may extend along at least 10% of the span from the tip. In another embodiment, the frangible airfoil portion may extend along at least 15% but less than 50% of the span from the tip. In one particular embodiment, the at least one of the first plurality of composite plies or the second plurality of composite plies may include carbon matrix composite plies. In certain embodiments, the airfoil may be a fan blade of a gas turbine engine.

In further embodiments, the second plurality of composite plies may further include composite plies having fibers oriented in one or more residual layup angles defined relative to the span. In such an embodiment, the one or more residual layup angles may include at least one of a forty-five degree angle from the span toward the chordwise direction or a negative forty-five degree angle from the span toward the chordwise direction.

In a further embodiment, the first plurality of composite plies may have fibers oriented at one or more frangible layup angles defined relative to the span. In such an embodiment, the one or more frangible layup angles may include at least one of a forty-five degree angle, a negative forty-five degree angle, a positive thirty degree angle, or a negative thirty degree angle.

In another aspect, the present subject matter is directed to a gas turbine engine defining a central axis. The gas turbine engine includes an engine shaft extending along the central axis, a compressor attached to the engine shaft and extending radially about the central axis, a combustor positioned downstream of the compressor to receive a compressed fluid therefrom, a turbine mounted on the engine shaft downstream of the combustor to provide a rotational force to the compressor, and a plurality of airfoils operably connected to the engine shaft. Each of the plurality of airfoils defines a span extending in a spanwise direction between a root and a tip, a chordwise direction extending between a leading edge and a trailing edge, and a thickness direction extending between a pressure side and a suction side.

Each includes a frangible airfoil portion extending between the leading edge and the trailing edge and extending between the tip and a frangible line along the span. The frangible airfoil portion includes a first plurality of composite plies having fibers that are oriented at least partially in the chordwise direction, the thickness direction, or both. Each airfoil further includes a residual airfoil portion extending from the frangible line to the root along the span. The residual airfoil portion includes a second plurality of composite plies. The second plurality of composite plies includes at least one composite ply with fibers oriented along the span. Further, the residual airfoil portion meets the frangible airfoil portion at the frangible line. It should be further understood that the gas turbine engine may further include any of the additional features as described herein.

In another aspect, the present subject matter is directed to a method of forming a frangible airfoil. The frangible airfoil defines a span extending in a spanwise direction between a root and a tip, a chordwise direction extending between a leading edge and a trailing edge, and a thickness direction extending between a pressure side and a suction side. The method includes laying up a plurality of composite plies to form a residual airfoil portion. The plurality of composite plies includes at least one composite ply with fibers oriented along the spanwise direction. The method further includes laying up a plurality of composite plies to form a frangible airfoil portion. The plurality of composite plies forming the frangible airfoil portion have fibers that are oriented at least partially along the chordwise direction, the thickness direction, or both. Another step of the method includes processing the plurality of composite plies to form the frangible airfoil. It should be further understood that the method may further include any of the additional features as described herein.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which.

Figure 1:
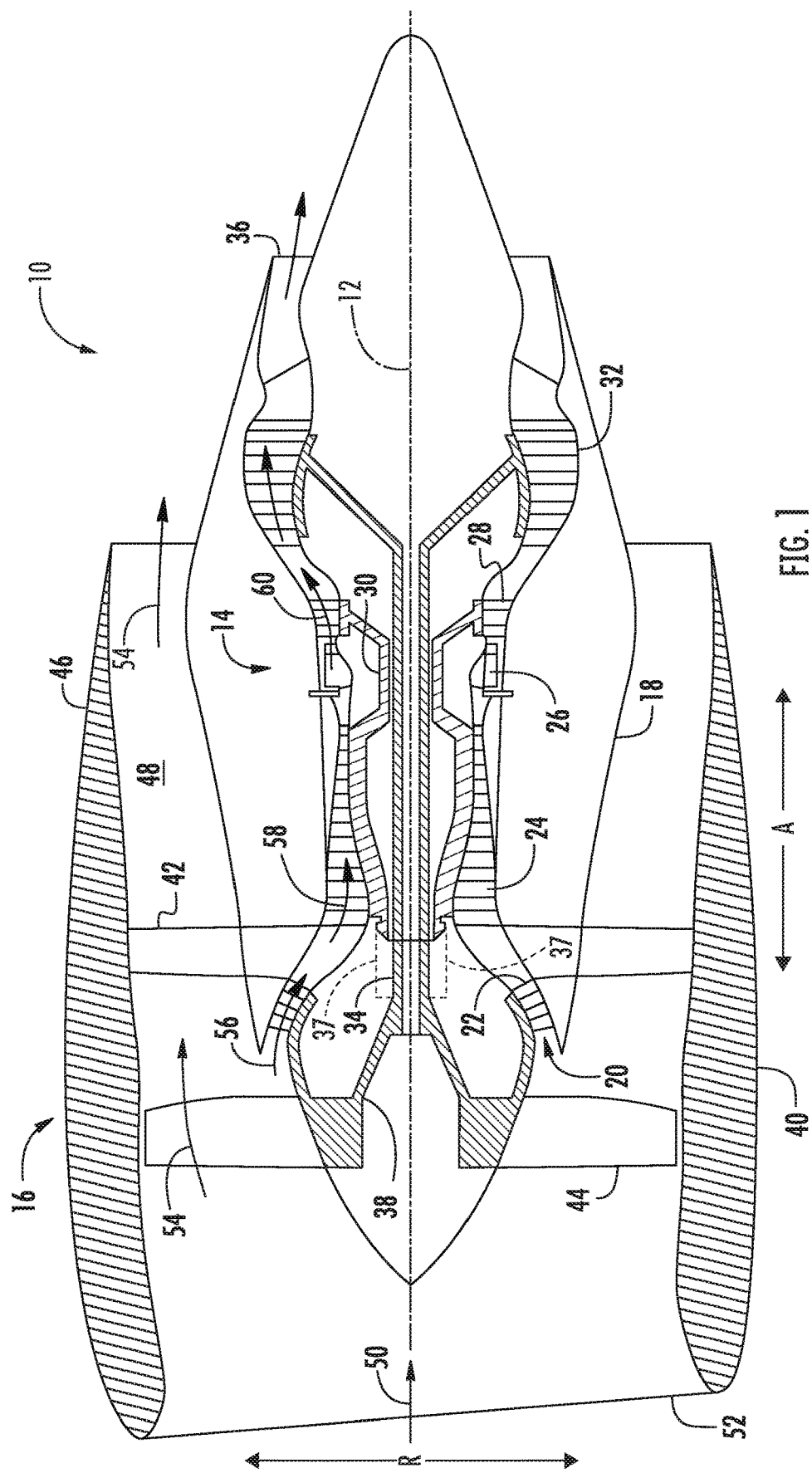
FIG. 1 illustrates a cross-sectional view of one embodiment of a gas turbine engine that may be utilized within an aircraft in accordance with aspects of the present subject matter, particularly illustrating the gas turbine engine configured as a high-bypass turbofan jet engine.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The terms "communicate," "communicating," "communicative," and the like refer to both direct communication as well as indirect communication such as through a memory system or another intermediary system.

A frangible airfoil for gas turbine engines is generally provided. The airfoil may define a frangible line separating a frangible airfoil portion and a residual airfoil portion. The residual airfoil portion may extend between the frangible line and an airfoil root along a span. Further, the airfoil may define the frangible airfoil portion extending between the frangible line and the tip along the span. The frangible airfoil portion positioned radially outward from the frangible line may include a reduced bending stiffness such that the frangible airfoil portion may break-off or bend during a failure mode of the airfoil. More particularly, the residual airfoil portion may include at least one composite ply with fibers oriented along a spanwise direction to increase the bending stiffness along the span. The frangible airfoil portion may include composite plies having fibers oriented at least partially along a chordwise direction of the airfoil, a thickness direction of the airfoil, or both, such that the frangible airfoil defines a reduced bending stiffness along the span. The embodiments generally shown and described herein may enable a controlled and consistent failure of the airfoil, such as a fan blade, following a failure event, such as a hard rub against a surrounding fan case. The embodiments generally described herein enable the airfoil to deform or detach at a desired span of the airfoil to mitigate load transfer to a surrounding casing. The embodiments generally provided herein may further enable the airfoil to deform or detach such that excessive or extreme unbalance of the fan rotor may be reduced following a failure event, such as airfoil liberation, foreign object damage (e.g., bird strikes, icing, etc.), or loss of lube or damper to a bearing assembly.

Referring now to the drawings, FIG. 1 illustrates a cross-sectional view of one embodiment of a gas turbine engine 10 that may be utilized within an aircraft in accordance with aspects of the present subject matter. More particularly, for the embodiment of FIG. 1, the gas turbine engine is a high-bypass turbofan jet engine, with the gas turbine engine 10 being shown having a longitudinal or axial centerline axis 12 extending therethrough along an axial direction A for reference purposes. The gas turbine engine 10 further defines a radial direction R extended from the centerline 12. Although an exemplary turbofan embodiment is shown, it is anticipated that the present disclosure can be equally applicable to turbomachinery in general, such as an open rotor, a turboshaft, turbojet, or a turboprop configuration, including marine and industrial turbine engines and auxiliary power units.

In general, the gas turbine engine 10 includes a core gas turbine engine (indicated generally by reference character 14) and a fan section 16 positioned upstream thereof. The core engine 14 generally includes a substantially tubular outer casing 18 that defines an annular inlet 20. In addition, the outer casing 18 may further enclose and support a low pressure (LP) compressor 22 for increasing the pressure of the air that enters the core engine 14 to a first pressure level. A multi-stage, axial-flow high pressure (HP) compressor 24 may then receive the pressurized air from the LP compressor 22 and further increase the pressure of such air. The pressurized air exiting the HP compressor 24 may then flow to a combustor 26 within which fuel is injected into the flow of pressurized air, with the resulting mixture being combusted within the combustor 26. The high energy combustion products are directed from the combustor 26 along the hot gas path of the gas turbine engine 10 to a high pressure (HP) turbine 28 for driving the HP compressor 24 via a high pressure (HP) shaft or spool 30, and then to a low pressure (LP) turbine 32 for driving the LP compressor 22 and fan section 16 via a low pressure (LP) drive shaft or spool 34 that is generally coaxial with HP shaft 30. After driving each of turbines 28 and 32, the combustion products may be expelled from the core engine 14 via an exhaust nozzle 36 to provide propulsive jet thrust.

Figure 2:
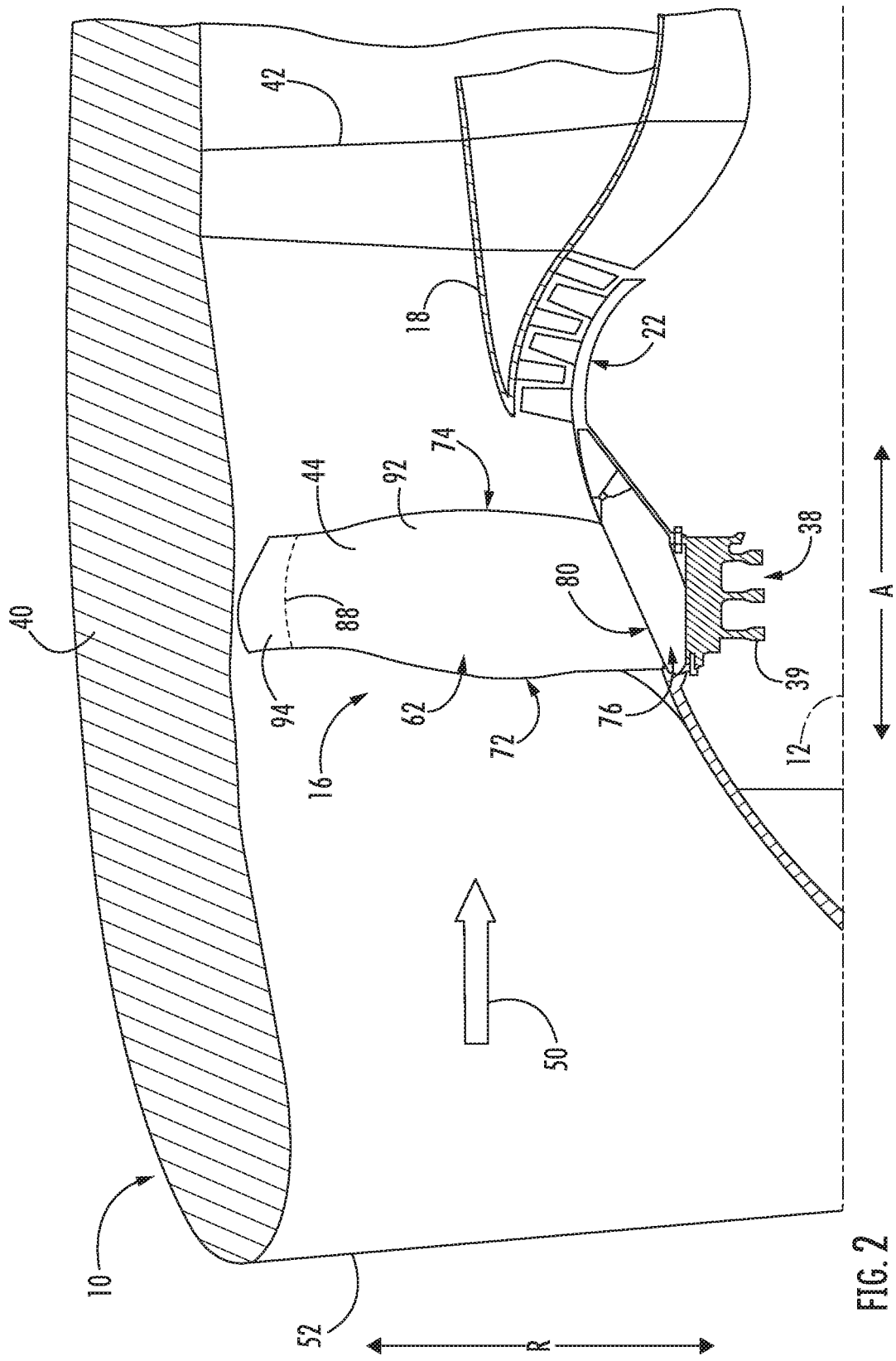
FIG. 2 illustrates a cross-sectional view of the fan section of FIG. 1 in accordance with aspects of the present subject matter, particularly illustrating a fan blade of the fan section.

Additionally, as shown in FIGS. 1 and 2, the fan section 16 of the gas turbine engine 10 generally includes a rotatable, axial-flow fan rotor 38 configured to be surrounded by an annular fan casing 40. In particular embodiments, the LP shaft 34 may be connected directly to the fan rotor 38 or rotor disk 39, such as in a direct-drive configuration. In alternative configurations, the LP shaft 34 may be connected to the fan rotor 38 via a speed reduction device 37 such as a reduction gear gearbox in an indirect-drive or geared-drive configuration. Such speed reduction devices may be included between any suitable shafts/spools within the gas turbine engine 10 as desired or required.

It should be appreciated by those of ordinary skill in the art that the fan casing 40 may be configured to be supported relative to the core engine 14 by a plurality of substantially radially-extending, circumferentially-spaced outlet guide vanes 42. As such, the fan casing 40 may enclose the fan rotor 38 and its corresponding fan rotor blades (fan blades 44). Moreover, a downstream section 46 of the fan casing 40 may extend over an outer portion of the core engine 14 so as to define a secondary, or by-pass, airflow conduit 48 that provides additional propulsive jet thrust.

During operation of the gas turbine engine 10, it should be appreciated that an initial airflow (indicated by arrow 50) may enter the gas turbine engine 10 through an associated inlet 52 of the fan casing 40. The air flow 50 then passes through the fan blades 44 and splits into a first compressed air flow (indicated by arrow 54) that moves through the by-pass conduit 48 and a second compressed air flow (indicated by arrow 56) which enters the LP compressor 22. The pressure of the second compressed air flow 56 is then increased and enters the HP compressor 24 (as indicated by arrow 58). After mixing with fuel and being combusted within the combustor 26, the combustion products 60 exit the combustor 26 and flow through the HP turbine 28. Thereafter, the combustion products 60 flow through the LP turbine 32 and exit the exhaust nozzle 36 to provide thrust for the gas turbine engine 10.

Figure 3:
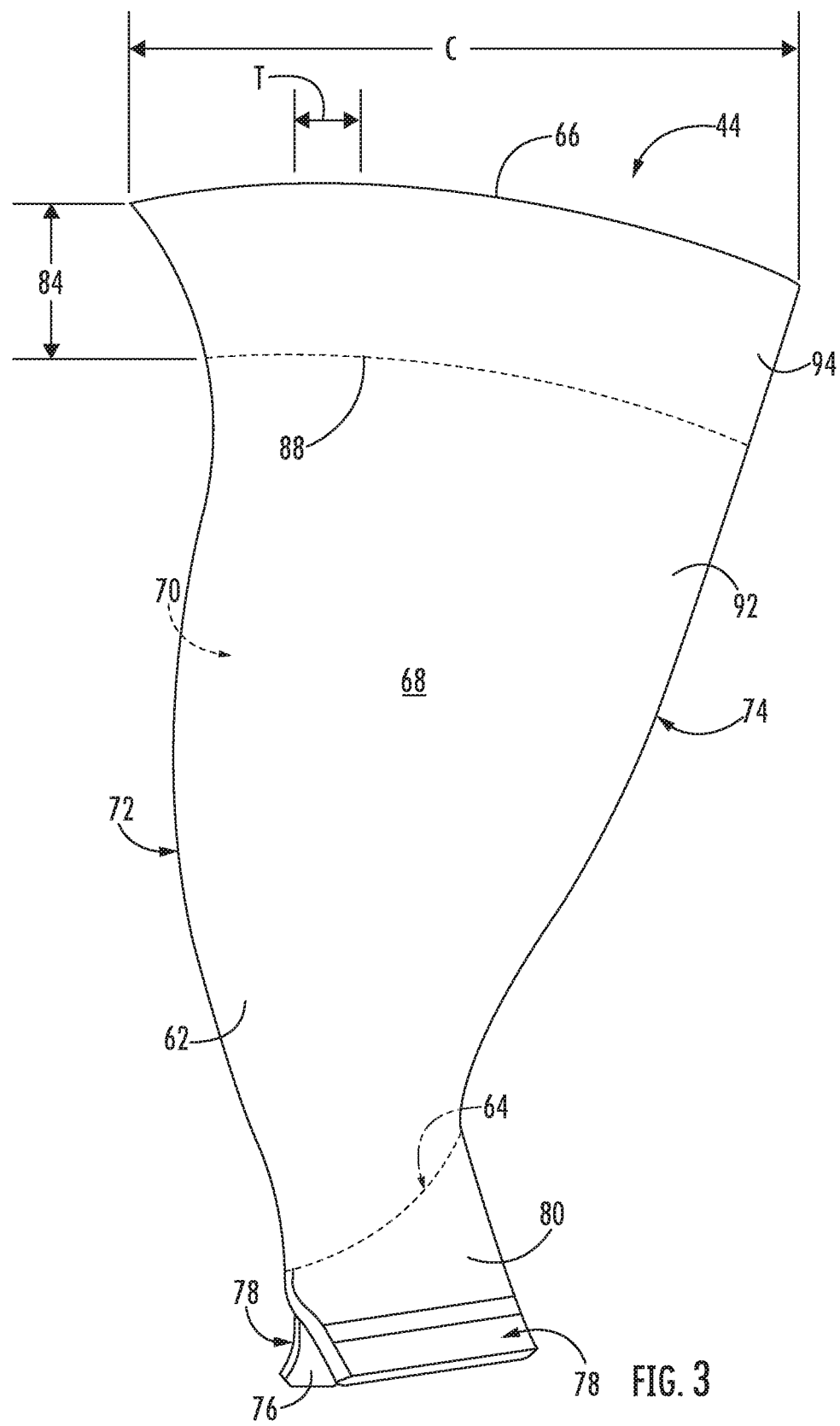
FIG. 3 illustrates a fan blade of the fan section of FIGS. 1 and 2 in accordance with aspects of the present subject matter, particularly illustrating a frangible airfoil portion and a residual airfoil portion.

Referring to FIGS. 2 and 3, exemplary airfoil 62 embodiments are provided in the context of a fan blade 44. Although the illustrated airfoils 62 are shown as part of a fan blade 44, it is understood that the following discussion of an airfoil 62 may be equally applied to another airfoil embodiment, e.g., a stator vane or rotor blade of a compressor 22, 24 and/or turbine 28, 32 (see FIG. 1). As shown, each fan blade 44 extends radially outwardly along a span defining a spanwise direction S from an airfoil root 64 to an airfoil tip 66. A pressure side 68 and a suction side 70 of the airfoil 62 extend from the airfoil's leading edge 72 to a trailing edge 74 and between the airfoil root 64 and airfoil tip 66 along the span. Further, it should be recognized that airfoil 62 may define a chordwise direction C along a chord at each point along the span and extending between the leading edge 72 and the trailing edge 74. Further, the chord may vary along the span of the airfoil 62. For instance, in the depicted embodiment, the chord increases along the span toward the airfoil tip 66. Though, in other embodiments, the chord may be approximately constant throughout the span or may decrease from the airfoil root 64 to the airfoil tip 66.

As shown particularly in FIG. 3, the airfoil 62 may define a thickness direction T along a thickness extending between the pressure side 68 and the suction side 70 at each point along the span. In certain embodiments, the thickness may be approximately constant throughout the span of the airfoil 62. In other embodiments, the airfoil 62 may define a variable thickness between the airfoil root 64 and the airfoil tip 66. For instance, the thickness may generally decrease along the span toward the airfoil tip 66. Additionally, the airfoil 62 may define an approximately constant thickness along the chord at each point along the span. Or, in other embodiments, at least one point along the span of the airfoil 62 may define a variable thickness along the chord. For instance, the airfoil 62 may define a maximum thickness at a position along the chord at each point along the span.

Optionally, each fan blade 44 includes an integral component having an axial dovetail 76 with a pair of opposed pressure faces 78 leading to a transition section 80. When mounted within the gas turbine engine 10, as illustrated in FIG. 2, the dovetail 76 is disposed in a dovetail slot of the fan rotor disk 39, thereby attaching the fan blades 44 to the fan rotor 38.

The airfoil 62 may include a plurality of composite plies 82 (see, e.g., FIGS. 4-7) extending from the leading edge 72 to the trailing edge 74 and between the airfoil tip 66 and the airfoil root 64. For instance, one or more composite plies 82 may extend from the airfoil tip 66 to the airfoil root 64. Or, in further embodiments, one or more composite plies 82 may be positioned in an end-to-end arrangement. For instance, two composite plies 82 may be arranged end-to-end to extend along the spanwise direction S from the airfoil root 64 to the airfoil tip 66. Though, in further embodiments, more than two composite plies 82 may be arranged end-to-end to extend along the spanwise direction S, such as three or more composite plies 82.

Further, the airfoil 62 may define a frangible line 88 separating a frangible airfoil portion 94 and a residual airfoil portion 92. The frangible airfoil portion 94 may generally be positioned toward the airfoil tip 66 and extend between the leading edge 72 and trailing edge 74 and between the airfoil tip 66 and the frangible line 88. The residual portion may extend from the frangible line 88 to the airfoil root 64 along the spanwise direction S. As explained in more detail in regards to FIGS. 4-6, the frangible airfoil portion 94 includes composite plies 82 having fibers 102 oriented at least partially along the chordwise direction C, the thickness direction T, or both. The residual airfoil portion 92 may include at least one composite ply 82 with fibers 102 oriented along the spanwise direction S. More particularly, the frangible airfoil portion 94 may include a first plurality of composite plies 86 (see, e.g., FIGS. 4, 5, and 7). The residual airfoil portion 92 may include a second plurality of composite plies 90 (see, e.g., FIGS. 6 and 7). It should be recognized that one or more composite plies 82 may be a part of both the first plurality of composite plies 86 and the second plurality of composite plies 90. For example, at least one composite ply 82 may extend the entire span from the airfoil root 64 to the airfoil tip 66.

As further illustrated in FIG. 3, the frangible line 88 may generally extend along the chordwise direction C between the leading edge 72 and the trailing edge 74. It should be recognized that the frangible line 88 may generally extend along the chordwise direction C at approximately the same point along the span. In other embodiments, the frangible line 88 may at least partially extend radially inward or outward (e.g., along the spanwise direction S) as the frangible line 88 extends axially along the chordwise direction C toward the trailing edge 74. For instance, in certain embodiments, the frangible line 88 may be defined along the chordwise direction C at one point along the span. In other embodiments, the frangible line 88 may extend along a variable percentage of the span from the leading edge 72 to the trailing edge 74. In one embodiment, the frangible airfoil portion 94 may extend along at least 10% of the span from the airfoil tip 66, such as along a chordwise direction C at one point along spanwise. More particularly, as illustrated, the frangible airfoil portion 94 may define a frangible height 84 extending between the airfoil tip 66 and the frangible line 88. As such, the frangible height 84 may extend along at least ten percent of the span between the leading edge 72 and the trailing edge 74. In another embodiment, the frangible airfoil portion 94 and/or the frangible height 84 may extend along at least 15% but less than 50% of the span between the leading edge 72 and the trailing edge 74. The frangible airfoil portion 94 may have a reduced overall bending stiffness compared to the residual airfoil portion 92, as described in more detail below in regards to FIGS. 4-7.

Referring particularly to the exemplary airfoil 62 of FIG. 3, the airfoil 62 may be configured to fracture, break, or liberate at approximately the frangible line 88 up to the airfoil tip 66 (e.g., the frangible airfoil portion 94) following a loading or impact upon the airfoil 62. For example, the airfoil 62 configured as the fan blade 44 within the fan casing 40 or nacelle of the gas turbine engine 10 (FIG. 1) may be configured to detach, decouple, deform, break, or liberate the frangible airfoil portion 94 of the airfoil 62 at or above the frangible line 88. In one non-limiting example, the frangible airfoil portion 94 of the airfoil 62 may be defined as the difference in spanwise dimensions of the frangible airfoil portion 94 and the residual airfoil portion 92. For example, the frangible airfoil portion 94 may be defined within approximately 3% to approximately 15% (e.g., the frangible height 84) of the total span from the airfoil tip 66.

During operation of the gas turbine engine 10, such as following an event generating substantial imbalance in the fan rotor 38 or LP shaft 34, the frangible airfoil portion 94, e.g., of the fan blade 44, as shown and described in various embodiments in FIGS. 4-7 may be configured to deform or partially or fully detach from the remainder of the airfoil 62, e.g., along the frangible line 88. Further, the frangible airfoil portion 94 may detach (e.g., along the frangible line 88) while leaving all of or at least a portion of the residual airfoil portion 92. Events generating substantial unbalance in the fan rotor 38 and/or LP shaft 34 may include, but are not limited to, foreign object damage (e.g., bird strikes, ice ingestion, other debris, etc.) or fan blade 44 detachment. Detaching or decoupling the frangible airfoil portion 94 may reduce undesired unbalance or vibrations as the fan rotor 38 and/or LP shaft 34 continue to rotate. Furthermore, the embodiments of the airfoil 62 generally shown and described in regard to FIGS. 4-7 may enable a lighter fan casing 44 or nacelle, such as reducing an amount of metal materials or abradable material of the fan casing 40 or nacelle.

In one embodiment, the airfoil 62, the frangible airfoil portion 94, and/or residual airfoil portion 92 may include at least one composite ply 82. For instance, the airfoil 62 may be formed at least partially from a ceramic matrix composite. More particularly, in certain embodiments, the airfoil 62 may be formed from one or more composite plies 82 configured as ceramic matrix composite prepreg plies.

Composite materials may include, but are not limited to, metal matrix composites (MMCs), polymer matrix composites (PMCs), or ceramic matrix composites (CMCs). Composite materials, such as may be utilized in the airfoil 62, generally comprise a fibrous reinforcement material embedded in matrix material, such as polymer, ceramic, or metal material. The reinforcement material serves as a load-bearing constituent of the composite material, while the matrix of a composite material serves to bind the fibers together and act as the medium by which an externally applied stress is transmitted and distributed to the fibers.

Exemplary CMC materials may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYL-RAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as the composite plies 82) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition.

Similarly, in various embodiments, PMC materials may be fabricated by impregnating a fabric or unidirectional tape with a resin (prepreg), followed by curing. For example, multiple layers of prepreg plies (e.g., the composite plies 82) may be stacked to the proper thickness and orientation for the part, and then the resin may be cured and solidified to render a fiber reinforced composite part. As another example, a die may be utilized to which the uncured layers of prepreg may be stacked to form at least a portion of the composite component. The die may be either a closed configuration (e.g., compression molding) or an open configuration that utilizes vacuum bag forming. For instance, in the open configuration, the die forms one side of the blade (e.g., the pressure side 68 or the suction side 70). The PMC material is placed inside of a bag and a vacuum is utilized to hold the PMC material against the die during curing. In still other embodiments, the airfoil 62 may be at least partially formed via resin transfer molding (RTM), light resin transfer molding (LRTM), vacuum assisted resin transfer molding (VARTM), a forming process (e.g. thermoforming), or similar.

Prior to impregnation, the fabric may be referred to as a "dry" fabric and typically comprises a stack of two or more fiber layers. The fiber layers may be formed of a variety of materials, non-limiting examples of which include carbon (e.g., graphite), glass (e.g., fiberglass), polymer (e.g., Kevlar®) fibers, and metal fibers. Fibrous reinforcement materials can be used in the form of relatively short chopped fibers, generally less than two inches in length, and more preferably less than one inch, or long continuous fibers, the latter of which are often used to produce a woven fabric or unidirectional tape. Other embodiments may include other textile forms such as plane weave, twill, or satin.

In one embodiment, PMC materials can be produced by dispersing dry fibers into a mold, and then flowing matrix material around the reinforcement fibers. Resins for PMC matrix materials can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific examples of high performance thermoplastic resins that have been contemplated for use in aerospace applications include polyetheretherketone (PEEK), polyetherketoneketone (PEKK), polyetherimide (PEI), and polyphenylene sulfide (PPS). In contrast, once fully cured into a hard rigid solid, thermoset resins do not undergo significant softening when heated but, instead, thermally decompose when sufficiently heated. Notable examples of thermoset resins include epoxy, bismaleimide (BMI), and polyimide resins.

Figure 5:
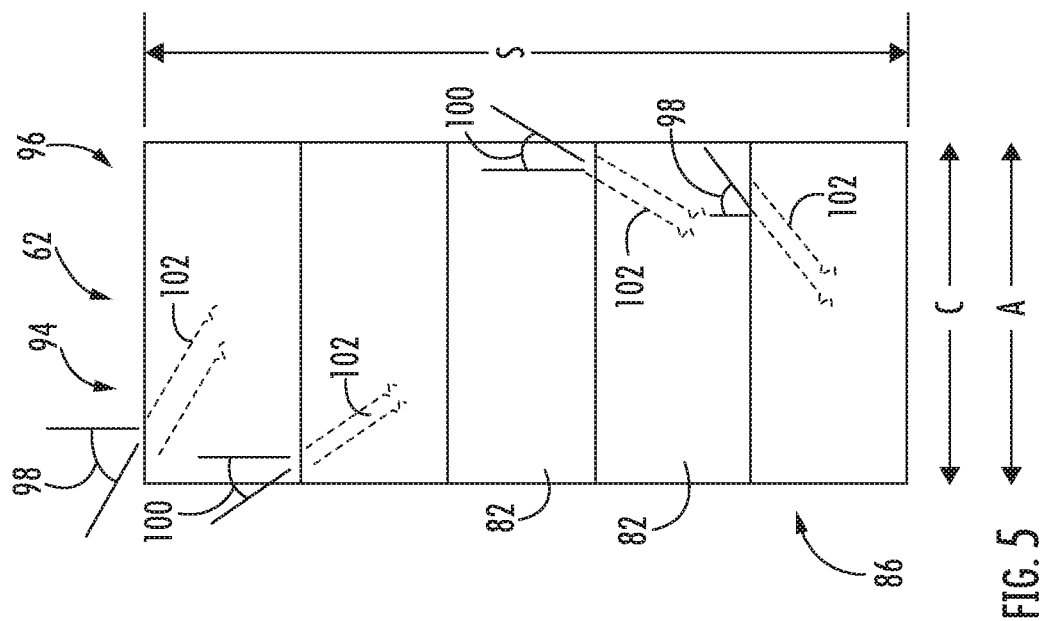
FIG. 5 illustrates another view of the frangible airfoil portion accordance with aspects of the present subject matter, particularly illustrating the frangible layup orientation along the chord with composite plies cut away to illustrate one or more frangible layup angles.
Figure 4:
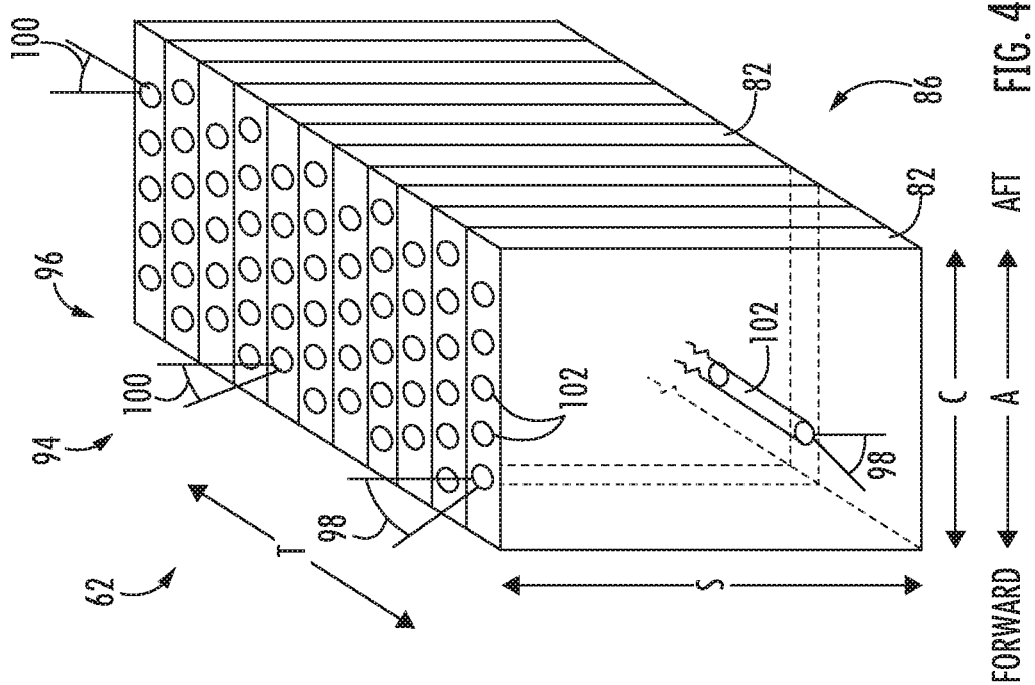
FIG. 4 illustrates one embodiment frangible airfoil portion in accordance with aspects of the present subject matter, particularly illustrating a frangible layup orientation of the frangible airfoil portion.

Referring now to FIGS. 4 and 5, the frangible airfoil portion 94 is illustrated in accordance with aspects of the present subject matter. Particularly, FIG. 4 illustrates a frangible layup orientation 96 of the composite plies 82. FIG. 5 illustrates the frangible layup orientation 96 along the chordwise direction C with composite plies 82 cut away along the thickness direction T to illustrate one or more frangible layup angles 98, 100. The frangible airfoil portion 94 may include the first plurality of composite plies 86. Each of the first plurality of composite plies 86 may include fibers 102 oriented at least partially along the chordwise direction C, the thickness direction T, or both.

As shown, each composite ply 82 may include a plurality of composite fibers 102. As such, the composite fibers 102 of the first plurality of composite plies 86 may be oriented at one or more frangible layup angles 98, 100 defined relative to the span. In such an embodiment, the frangible layup orientation 96 may define a first frangible layup angle 98 and a second frangible layup angle 100. For instance, the first frangible layup angle 98 may define a greater angle than the second frangible layup angle 100. At least one of the composite plies 82 may include fibers 102 oriented at the first frangible layup angle 98 toward the chordwise direction C in the forward direction (i.e., a positive first frangible layup angle). Further, at least one of the composite plies 82 may include fibers 102 oriented at the first frangible layup angle 98 toward the chordwise direction C in the aft direction (i.e., a negative first frangible layup angle). As such, multiple composite plies 82 of the frangible airfoil portion 94 may include fibers 102 oriented at the first frangible layup angle 98 (e.g., a portion oriented forward at a positive first frangible layup angle and a portion oriented aftward at a negative first frangible layup angle). In certain embodiments, the first frangible layup angle 98 may be a forty-five degree angle oriented along the chordwise direction C toward at least one of the forward or aft directions.

Similarly, at least one of the composite plies 82 may include fibers 102 oriented at the second frangible layup angle 100 along the chordwise direction C in the forward direction (i.e., a positive second frangible layup angle). Further, at least one of the composite plies 82 may include fibers 102 oriented at the second frangible layup angle 100 toward the chordwise direction C in the aft direction (i.e., a negative first frangible layup angle). As such, multiple composite plies 82 of the frangible airfoil portion 94 may include fibers 102 oriented at the second frangible layup angle 100 (e.g., a portion oriented forward at a positive second frangible layup angle and a portion oriented aftward at a negative second frangible layup angle). In certain embodiments, the second frangible layup angle 100 may be a thirty degree angle oriented along the chordwise direction C toward at least one of the forward or aft directions.

It should be recognized that other frangible layup orientations 96 may include composite plies 82 with fibers 102 oriented at more than two frangible layup angles, such as three or more frangible layup angles. It should further be recognized that the frangible layup angles 98, 100 may be defined as any angle greater than zero but less than ninety degrees. For example the frangible layup angles 98, 100 may be defined between five degrees and eighty-five degrees along the chordwise direction C in the forward direction and/or the aftward direction (e.g., positive and/or negative frangible layup angles). Though the depicted frangible layup angle(s) 98, 100 have been illustrated along the chordwise direction C, it should be appreciated that, additionally or alternatively, one or more frangible layup angles may be defined along the thickness direction T, such as toward the pressure or suction sides 68, 70.

Figure 6:
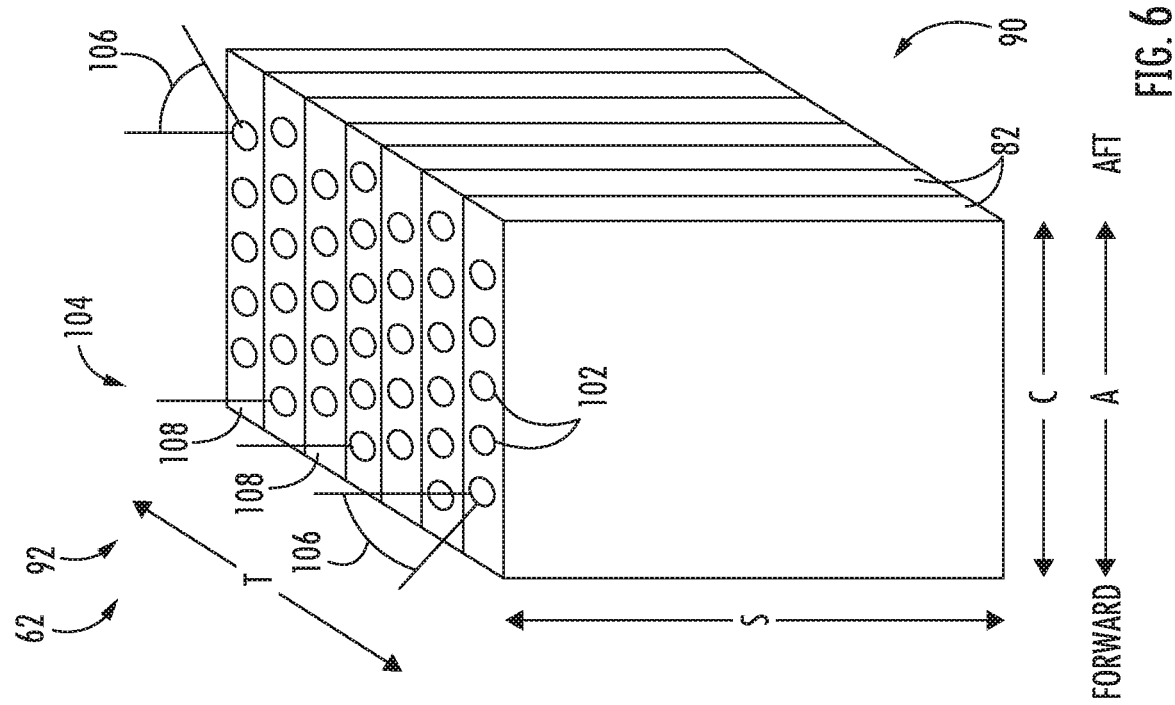
FIG. 6 illustrates one embodiment of the residual airfoil portion in accordance with aspects of the present subject matter, particularly illustrating a residual layup orientation of the residual airfoil portion.

Referring now to FIG. 6, the residual airfoil portion 92 is illustrated in accordance with aspects of the present subject matter. Particularly, FIG. 6 illustrates a residual layup orientation 104 of the composite plies 82. The residual airfoil portion 92 may include the second plurality of composite plies 90. The second plurality of composite plies 90 may include at least one composite ply 82 with fibers 102 oriented along the spanwise direction S or approximately along the spanwise direction S (e.g., within an angle of five degrees of the spanwise direction S). For instance, the second plurality of composite plies 90 may include at least one spanwise composite ply 108. In further embodiments, the second plurality of composite plies 90 may further include composite plies 82 with fibers 102 oriented at one or more residual layup angles 106 defined relative to the span.

At least one of the composite plies 82 may include fibers 102 oriented at the residual layup angle 106 along the chordwise direction C in the forward direction (i.e., a positive residual layup angle). Further, at least one of the composite plies 82 may include fibers 102 oriented at the residual layup angle 106 along the chordwise direction C in the aft direction (i.e., a negative residual layup angle). As such, multiple composite plies 82 of the residual airfoil portion 92 may include fibers 102 oriented at the residual layup angle 106 (e.g., a portion oriented forward at a positive residual layup angle and a portion oriented aftward at a negative residual layup angle). In certain embodiments, the residual layup angle 106 may be a forty-five degree angle oriented along the chordwise direction C toward at least one of the forward or aft directions.

It should be recognized that other residual layup orientations 104 may include composite plies 82 with fibers 102 oriented at more than one residual layup angle 106, such as two or more residual layup angles 106. It should further be recognized that the residual layup angles 106 may be defined as any angle greater than zero but less than ninety degrees. For example the residual layup angles 106 may be defined between five degrees and eighty-five degrees along the chordwise direction C in the forward direction and/or the aftward direction (e.g., positive and/or negative residual layup angles). Though the depicted residual layup angle 106 has been illustrated toward the chordwise C, it should be appreciated that, additionally or alternatively, one or more residual layup angles 106 may be defined along the thickness direction T, such as toward the pressure or suction sides 68, 70.

It should also be appreciated that composite plies 82 that extend through the frangible line 88 may include fibers 102 defining the same residual layup angle 106 and the same frangible layup angle 98, 100. For example, one or more composite plies 82 may extend along the spanwise direction S from the airfoil root 64 to the airfoil tip 66 with fibers 102 defining the same angle along the chordwise direction C and/or the thickness direction T at each point along the span.

Figure 7:
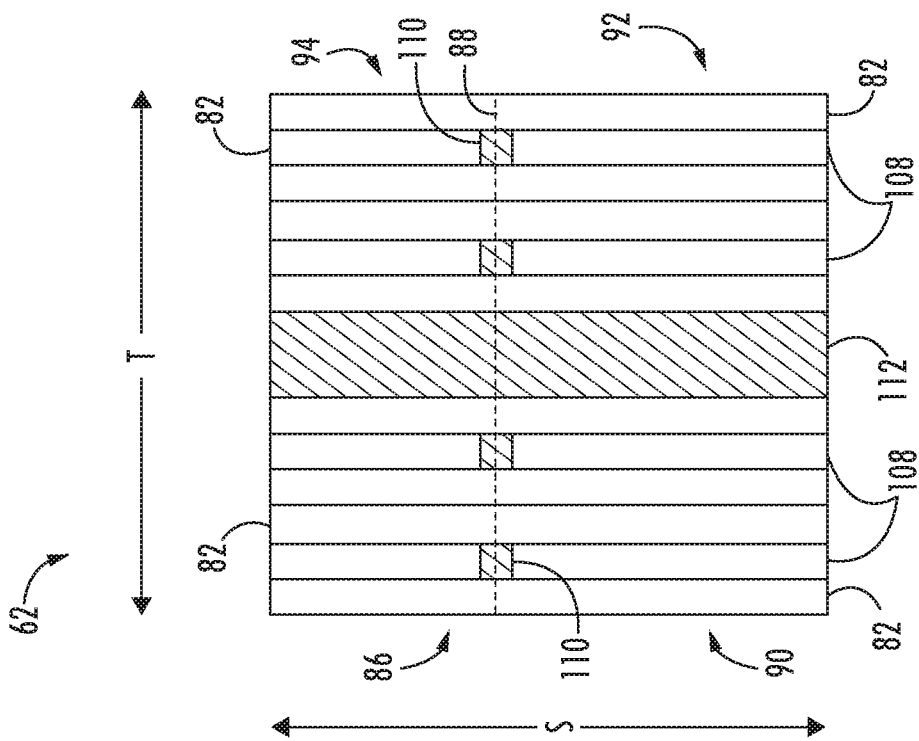
FIG. 7 illustrates a cross-section of the airfoil in accordance with aspects of the present subject matter, particularly illustrating a frangible line between the frangible airfoil portion and the residual airfoil portion.

Referring now to FIG. 7 a cross-section of the airfoil 62 is illustrated in accordance with aspects of the present disclosure. Particularly, FIG. 7 illustrates the frangible line 88 between the frangible airfoil portion 94 and the residual airfoil portion 92. In one embodiment, one or more butt joints 110 may join at least one composite ply 82 of the first plurality of plies 86 with at least one composite ply 82 of the second plurality of composite plies 90. For example, a butt joint 110 may join a spanwise composite ply 108 of the second plurality of composite plies 90 with a composite ply 82 of the first plurality of composite plies 86 (e.g., a composite ply 82 with fibers 102 defining a frangible layup angle 98, 100).

In the illustrated embodiments of FIG. 7, the plurality of composite plies 82 are bonded together as laminate stacks on an airfoil core 112. The stacks generally extend outward across the thickness direction T. The airfoil core 112 may form the base guide for laying up the composite plies 82. Although the airfoil core 112 is shown as a solid body for the sake of clarity, optional embodiments of the airfoil core 112 may be configured as additional plies parallel to one or more of the composite plies 82. For instance, in optional embodiments, the airfoil core 112 may include multiple composite plies 82 that are each continuous and free of any butt joint 110. Some continuous plies may extend uninterrupted or unbroken from the airfoil root 64 to the airfoil tip 66. Other embodiments of the airfoil core 112 may include one or more discontinuous plies having a corresponding butt joint 110. Further additional or alternative embodiments of the airfoil core 112 may define a hollow cavity extending partially or fully from the airfoil root 64 to the airfoil tip 66. Optionally, a stiffening material may be placed within or fill the hollow cavity. For instance, a woven core, a foam, or a suitable low density material may substantially fill a hollow cavity of the airfoil core 112.

It should be appreciated that the one or more butt joints 110 may define the frangible line 88 between the residual airfoil portion 92 and the frangible airfoil portion 94. For instance, one or more composite plies 82 of the second plurality of composite plies 90 including fibers 102 oriented along the spanwise direction S (e.g., the spanwise composite ply(ies) 108) may extend throughout the residual airfoil portion 92. Such spanwise composite ply(ies) 108 may be arranged end-to-end with composite plies 82 of the first plurality of composite plies 86, each including fibers 102 defining a frangible layup angle 98, 100. Such composite plies 82 may meet and be bonded together at the butt joint(s) 110. As such, the composite plies 82 with fibers 102 oriented along the spanwise direction S may be exchanged for composite plies 82 with fibers 102 oriented at least partially along the chordwise direction C or thickness direction T in the frangible airfoil portion 94. It should be appreciated that the spanwise location of such butt joint(s) 110 may define the frangible line 88 between the leading edge 72 and the trailing edge 74 (see, e.g., FIGS. 2 and 3).

The butt joint(s) 110 may include, for instance, a resin pool that frangibly attaches the spanwise composite ply 108 with another composite ply 82. In certain embodiments, the resin pool of the butt joint 110 will maintain a constant thickness along the spanwise direction S and/or the chordwise direction C. The resin may include a polymeric resin or epoxy. Optionally, the polymeric resin may include a material similar to or discrete from a matrix reinforcement included in the individual composite plies 82. Though, in other embodiments, it should be recognized that composite plies 82 of the first and second plurality of composite plies 86, 90 may be joined together using any means. For example, the composite plies 82 may be arranged end-to-end and fixed during a process to finish forming the composite component. In other embodiments, the composite plies 82 may be adhered or coupled together. Further, in one embodiment, composite plies may be joined together using one or more overlap joints.

In certain embodiments, as shown, all of the spanwise composite plies 108 may be exchanged for composite plies 82 defining the frangible layup angles 98, 100 in the frangible airfoil portion 94 (e.g., at the frangible line 88). Though it should be recognized that substantially all of the spanwise composite plies 108 may be exchanged for composite plies 82 defining the layup angles 98, 100. For instance, the frangible airfoil portion 94 may include a nominal percentage (e.g., 5% or less) of spanwise composite plies 108. In other embodiments, the frangible airfoil portion 94 may include a reduced percentage of fibers 102 oriented along the span S (e.g., a reduced number of spanwise composite plies 108). For instance, the fibers 102 of the residual airfoil portion 92 may include 30% or more of the fibers 102 oriented along the span S (or approximately along the span S), such as 50% or more of the fibers 102 oriented along the span S. In such an embodiment, the frangible airfoil portion 94 may include fewer fibers 102 oriented along the span S, such as 10% or less of the fibers 102 oriented along the span S. For example, the fibers 102 of the frangible airfoil portion 94 may include 5% or less of the fibers 102 oriented along the span S.

Further, in certain embodiments, the airfoil 62 may include a transition portion at the frangible line 88 between the residual airfoil portion 92 and the frangible airfoil portion 94 or included within the frangible airfoil portion 94. In such an embodiment, the transition portion may have fibers 102 including 20% to 30% of the fibers 102 oriented along the span S. Such a transition portion may extend along 30% or less of the span S at the point along the span S of the frangible line 88 (e.g., extending along the span S toward the airfoil tip 66 from the frangible line 88). In one embodiment, the transition portion may extend along at least 10% of the span S but less than 20% of the span S. As such, the percentage of fibers 102 oriented along the span S may reduce from the residual airfoil portion 92, to the transition portion, and then to the frangible portion 94. For instance, the residual airfoil portion 92 may have fibers 102 including 50% or more of the fibers 102 oriented along the spans S, the transition portion may have fibers 102 including 20-30% of the fibers 102 oriented along the span S, and the frangible airfoil portion 94 may have fibers 102 including 5% or less of the fibers 102 oriented along the span S.

Referring now generally to FIGS. 4-7, in certain embodiments, the residual airfoil portion 92 may define a portion of the airfoil 62 with a first overall bending stiffness. Similarly, the first plurality of composite plies 86 including fibers 102 oriented at least partially along the chordwise direction C and/or the thickness direction T may define a portion of the airfoil 62 with a second overall bending stiffness (e.g., the frangible airfoil portion 94) less than the first overall bending stiffness of the residual airfoil portion 92. In certain embodiment, the spanwise composite plies 108 increase the first overall bending stiffness of the residual airfoil portion 92. For instance, composite plies 82 may generally define in increased bending stiffness in the direction the fibers 102 are oriented. As such, the second plurality of composite plies 90 may define the first overall bending stiffness along the spanwise direction S greater than the second overall bending stiffness of the first plurality of composite plies 86. More particularly, the spanwise composite plies 108 of the residual airfoil portion 92 may lead to the increased bending stiffness of the residual airfoil portion 92 along the spanwise direction S. As such, the frangible airfoil portion 94 may have a reduced bending stiffness along the spanwise direction S allowing the frangible airfoil portion 94 to fracture, break, liberate, decouple, deform, deflect, etc. at or above the frangible line 88 as described above.

Figure 8:
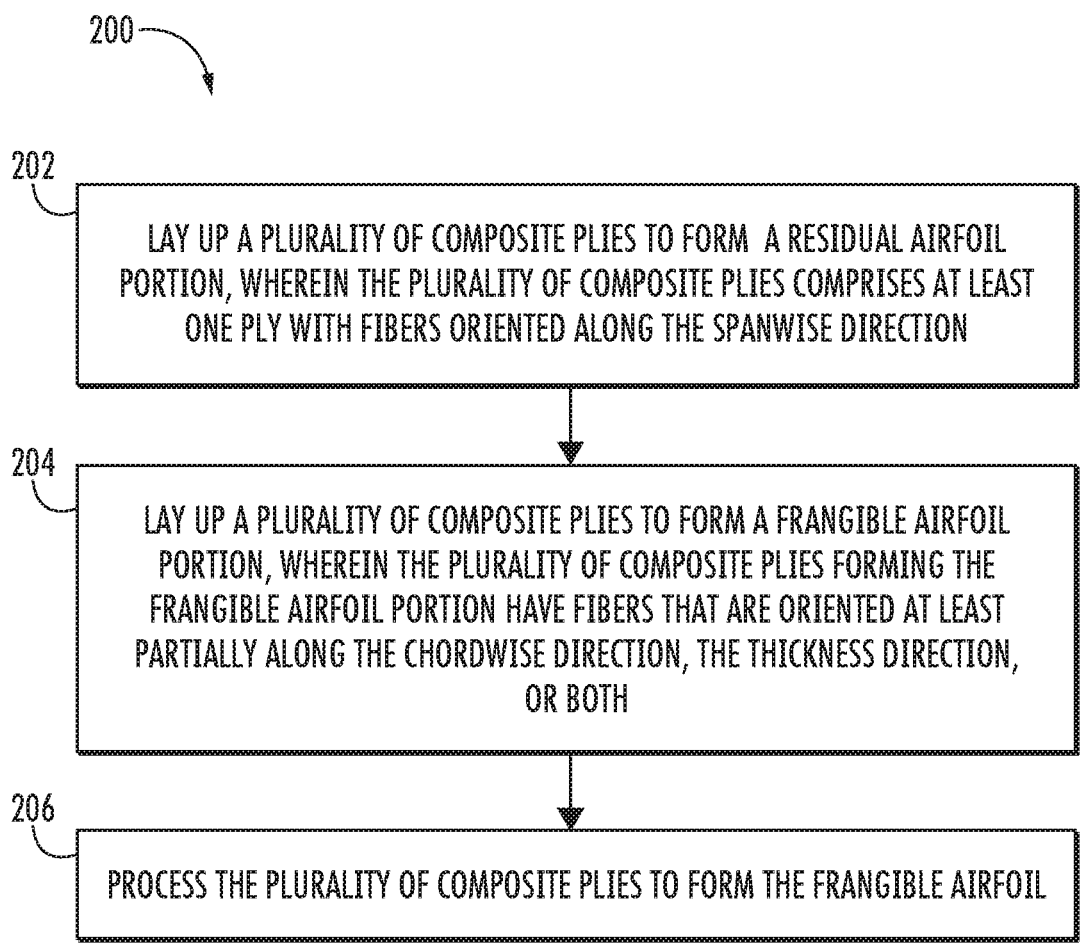
FIG. 8 depicts a method of forming a frangible airfoil in accordance with aspects of the present subject matter.

Referring now to FIG. 8, a method 200 of forming a frangible airfoil is depicted according to aspects of the present subject matter. Particularly, the method 200 may be used to form various embodiments of the airfoil 62 as illustrated in FIGS. 2-7. For, instance, the frangible airfoil may define a span extending in a spanwise direction S between a root and a tip, a chordwise direction C extending between a leading edge and a trailing edge, and a thickness direction T extending between a pressure side and a suction side.

The method 200 may include 202 laying up a plurality of composite plies to form a residual airfoil portion. In such an embodiment, the plurality of composite plies may include at least one composite ply with fibers oriented along the span. For instance, the plurality of composite plies may be the plurality of composite plies 82 (e.g., the second plurality of composite plies 90). Further, the at least one composite ply with fibers oriented along the span may be at least one spanwise composite ply 108. The method 200 may further include 204 laying up a plurality of composite plies to form a frangible airfoil portion. The plurality of composite plies forming the frangible airfoil portion have fibers that are oriented at least partially along the chordwise direction C, the thickness direction T, or both. For instance, the plurality of composite plies forming the frangible airfoil portion 94 may be the first plurality of composite plies 86. More particularly, each of the first plurality of composite plies 86 may include fibers 102 oriented at the frangible layup angle(s) 98, 100. The plurality of composite plies 82 may include a composite material such as a CMC material. The composite plies 82 may be laid up on a tool, mandrel, mold, or other suitable supporting device or surface.

In a further embodiment of the method 200, at least one of the composite plies 82 may be a prepreg ply. For example, at least a portion (e.g., the first and/or second plurality of composite plies 86, 90) of the composite plies 82 used to form the composite frangible airfoil may be prepreg plies. In one particular embodiment, all of the composite plies 82 may be prepreg plies. In a further embodiment, at least one of the composite plies 82 may a ceramic matrix composite ply, such as all of the composite plies 82. In certain embodiments, at least one of the composite plies 82 may be a ceramic matrix composite prepreg ply Another step of the method 200 may include 206 processing the plurality of plies to form the frangible airfoil. In one embodiment, processing the composite plies 82 may include compacting the composite plies 82. In another embodiment of the method 200, processing the composite plies may include autoclaving the composite plies 82. In a still further embodiment of the method 200, processing the composite plies 82 may include both compacting and autoclaving the composite plies 82. For instance, the composite plies 82 may be compacted and then processed in an autoclave. The compaction may be performed at atmosphere, i.e., at room temperature and pressure. The autoclave cycle may impart stiffness to the final ply and/or layup assembly through complete drying and/or curing of the composite constituents and produces the final dimensions of the composite component through full consolidation of the plies and/or sub-assemblies.

Further, in embodiments in which the composite plies 82 are processed in an autoclave, the composite plies 82 may be autoclaved using soft and/or hard tooling. For instance, the composite plies 82 may be autoclaved using metallic tooling, i.e., hard tooling, that is shaped to impart a desired shape to the frangible airfoil. As another example, the composite plies 82 may be autoclaved using soft tooling such as a vacuum bag, e.g., the composite plies 82 may be supported on a metal tool and then the composite plies 82 and tool may be bagged and the air removed from the bag to apply pressure to and compact the composite plies 82 before the composite plies 82 are processed in a autoclave cycle. For instance, processing composite plies 82 may include autoclaving the composite plies 82 to form an autoclaved body. Further, another step may include firing the autoclaved body to form a fired body. Processing the composite plies 82 may further include densifying the fired body to form the composite component. In certain embodiments, processing the composite plies 82 may include at least one of melt infiltration or polymer infiltration and pyrolysis.

In embodiments in which the composite material is a CMC material, the autoclaved body may undergo firing (or burn-off) to form a fired body, followed by densification to produce a densified CMC component that is a single piece component, i.e., the component is a continuous piece of CMC material. For instance, after autoclaving, the component may be placed in a furnace to burn off any mandrel-forming materials and/or solvents used in forming the CMC plies and to decompose binders in the solvents, and then placed in a furnace with silicon to convert a ceramic matrix precursor of the plies into the ceramic material of the matrix of the CMC component. The silicon melts and infiltrates any porosity created within the matrix as a result of the decomposition of the binder during burn-off/firing; the melt infiltration of the CMC component with silicon densifies the CMC component. However, densification may be performed using any known densification technique including, but not limited to, Silcomp, melt-infiltration (MI), chemical vapor infiltration (CVI), polymer infiltration and pyrolysis (PIP), and oxide/oxide processes. In one embodiment, densification and firing may be conducted in a vacuum furnace or an inert atmosphere having an established atmosphere at temperatures above 1200° C. to allow silicon or another appropriate material or materials to melt-infiltrate into the component.

Optionally, after processing, the composite component may be finish machined, if and as needed, and coated with one or more coatings, such as an environmental barrier coating (EBC). For example, the composite plies 82 that are wrapped around the core 112 may be oversized such that a portion of the composite plies 82 extend beyond the desired trailing edge 74 of the airfoil 62. Accordingly, after processing, the composite plies 82 may be machined to define the trailing edge 74.

Of course, the method 200 described with respect to FIG. 8 is provided by way of example only. As such, other known methods or techniques for compacting and/or curing composite plies 82, as well as for densifying a CMC component, may be utilized. Alternatively, any combinations of these or other known processes may be used and in any suitable order. Further, although the method 200 of FIG. 8 is described relative to fan blades 44, the method 200 may also be used to form other composite components, such as turbine nozzle blades and turbine stator vanes and/or compressor blades and vanes including airfoils 62 as exemplary composite components.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An airfoil defining a span extending in a spanwise direction between a root and a tip, a chordwise direction extending between a leading edge and a trailing edge, and a thickness direction extending between a pressure side and a suction side, the airfoil comprising:
   a frangible airfoil portion extending between the leading edge and the trailing edge and extending from the tip toward the root along the span, wherein the frangible airfoil portion comprises a first plurality of composite plies having fibers that are oriented at least partially in the chordwise direction, the thickness direction, or both; and
   a residual airfoil portion extending from the root toward the tip along the span, the residual airfoil portion comprising a second plurality of composite plies, wherein the second plurality of composite plies comprises at least one composite ply with fibers oriented along the spanwise direction,
   wherein the first plurality of composite plies define a first overall bending stiffness along the spanwise direction and the second plurality of composite plies define a second overall bending stiffness along the spanwise direction, the first overall bending stiffness less than the second overall bending stiffness, wherein a frangible line is defined at a location along the span moving from the root to the tip where the second overall bending stiffness transitions to the first overall bending stiffness, and wherein the residual airfoil portion meets the frangible airfoil portion at the frangible line.

2. The airfoil of claim 1, wherein the frangible airfoil portion deforms or partially or fully detaches relative to the residual airfoil portion at the frangible line following an event creating imbalance.

3. The airfoil of claim 1, wherein one or more butt joints join at least one composite ply of the first plurality of composite plies with at least one composite ply of the second plurality of composite plies.

4. The airfoil of claim 1, wherein the frangible airfoil portion extends along at least 10% of the span from the tip.

5. The airfoil of claim 1, wherein the frangible airfoil portion extends along at least 15% but less than 50% of the span from the tip.

6. The airfoil of claim 1, wherein the second plurality of composite plies further comprises composite plies having fibers oriented in one or more residual layup angles defined relative to the spanwise direction.

7. The airfoil of claim 6, wherein the one or more residual layup angles comprise at least one of a forty-five degree angle from the spanwise direction toward the chordwise direction or a negative forty-five degree angle from the spanwise direction toward the chordwise direction.

8. The airfoil of claim 1, wherein the first plurality of composite plies has fibers oriented at one or more frangible layup angles defined relative to the spanwise direction.

9. The airfoil of claim 8, wherein the one or more frangible layup angles comprise at least one of a forty-five degree angle, a negative forty-five degree angle, a positive thirty degree angle, or a negative thirty degree angle.

10. The airfoil of claim 1, wherein the at least one of the first plurality of composite plies or the second plurality of composite plies comprise carbon matrix composite plies.

11. The airfoil of claim 1, wherein the airfoil is part of a fan blade of a gas turbine engine.

12. A gas turbine engine defining a central axis, the gas turbine engine comprising:
   an engine shaft extending along the central axis;
   a compressor attached to the engine shaft and extending radially about the central axis;
   a combustor positioned downstream of the compressor to receive a compressed fluid therefrom;
   a turbine mounted on the engine shaft downstream of the combustor to provide a rotational force to the compressor; and
   a plurality of airfoils operably connected to the engine shaft, each of the plurality of airfoils defining a span extending in a spanwise direction between a root and a tip, a chordwise direction extending between a leading edge and a trailing edge, and a thickness direction extending between a pressure side and a suction side, each airfoil comprising:
      a frangible airfoil portion extending between the leading edge and the trailing edge and extending from the tip toward the root along the span, wherein the frangible airfoil portion comprises a first plurality of composite plies having fibers that are oriented at least partially in the chordwise direction, the thickness direction, or both; and
      a residual airfoil portion extending from the root toward the tip along the span, the residual airfoil portion comprising a second plurality of composite plies, wherein the second plurality of composite plies comprises at least one composite ply with fibers oriented along the spanwise direction, wherein a first percentage of the fibers of the first plurality of composite plies is oriented along the spanwise direction and define a first overall bending stiffness along the spanwise direction, a second percentage of the fibers of the second plurality of composite plies is oriented along the spanwise direction and define a second overall bending stiffness along the spanwise direction, the first overall bending stiffness of the first percentage of fibers less than the second overall bending stiffness of the second percentage of fibers, wherein a frangible line is defined at a location along the span moving from the root to the tip where the second overall bending stiffness of the second percentage of fibers transitions to the first overall bending stiffness of the first percentage of fibers, and wherein the residual airfoil portion meets the frangible airfoil portion at the frangible line.

13. The gas turbine engine of claim 12, further comprising a fan section including the plurality of airfoils configured as fan blades.

14. The gas turbine engine of claim 12, wherein for each airfoil one or more butt joints join at least one composite ply of the first plurality of composite plies with at least one composite ply of the second plurality of composite plies.

15. The gas turbine engine of claim 12, wherein for each airfoil the frangible airfoil portion extends along at least 10% of the span from the tip.

16. The gas turbine engine of claim 12, wherein for each airfoil the frangible airfoil portion extends along at least 15% but less than 50% of the span from the tip.

17. The gas turbine engine of claim 12, wherein for each airfoil the second plurality of composite plies further comprises composite plies having fibers oriented in one or more residual layup angles defined relative to the spanwise direction, wherein the one or more residual layup angles comprise at least one of a forty-five degree angle from the spanwise direction toward the chordwise direction or a negative forty-five degree angle from the spanwise direction toward the chordwise direction.

18. The gas turbine engine of claim 12, wherein for each airfoil the first plurality of composite plies has fibers oriented at one or more frangible layup angles defined relative to the spanwise direction.

19. The gas turbine engine of claim 18, wherein for each airfoil the one or more frangible layup angles comprise at least one of a forty-five degree angle, a negative forty-five degree angle, a positive thirty degree angle, or a negative thirty degree angle.

20. A method of forming a frangible airfoil, the frangible airfoil defining a span extending in a spanwise direction between a root and a tip, a chordwise direction extending between a leading edge and a trailing edge, and a thickness direction extending between a pressure side and a suction side, the method comprising:

laying up a plurality of composite plies to form a residual airfoil portion, wherein the plurality of composite plies comprises at least one composite ply with fibers oriented along the spanwise direction, a percentage of the fibers of the residual airfoil portion oriented along the spanwise direction;

laying up a plurality of composite plies to form a frangible airfoil portion, wherein the plurality of composite plies forming the frangible airfoil portion comprises fibers that are oriented at least partially along the chordwise direction, the thickness direction, or both, a percentage of the fibers of the frangible airfoil portion oriented along the spanwise direction less than the percentage of fibers oriented along the spanwise direction of the residual airfoil portion; and processing the plurality of composite plies of the residual airfoil portion and the frangible airfoil portion to form the frangible airfoil, wherein the frangible airfoil portion defines an overall bending stiffness along the spanwise direction less than an overall bending stiffness along the spanwise direction defined by the residual airfoil portion after the plurality of composite plies of the residual airfoil portion and the frangible airfoil portion are processed.

* * * * *